Aug. 7, 1928.  1,680,220
A. L. LANGEL
MOUNTING FOR BAKING PANS
Filed Oct. 10, 1927   2 Sheets-Sheet 1
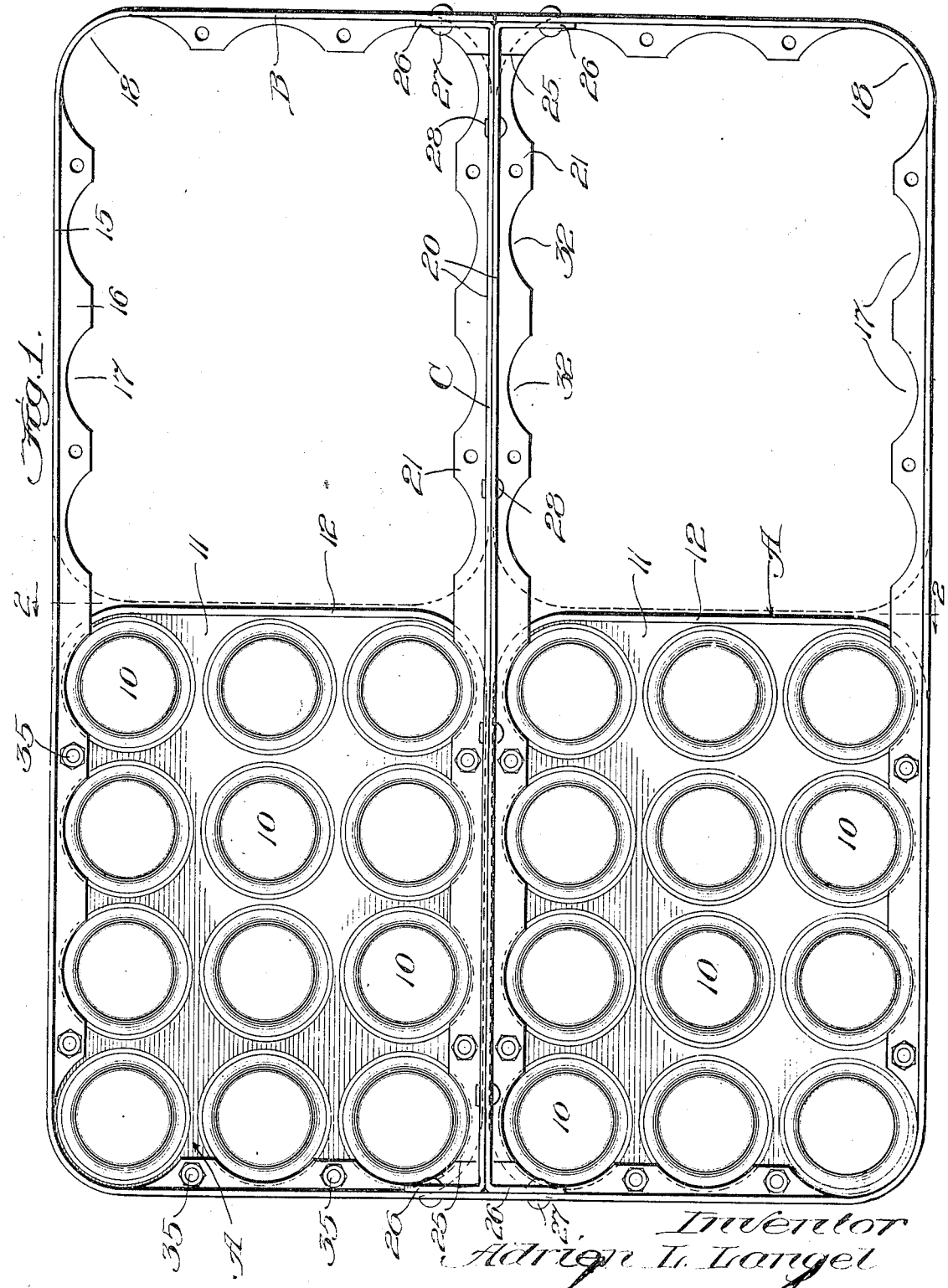

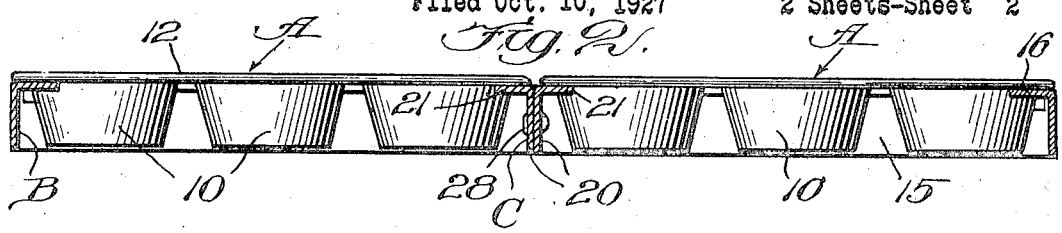
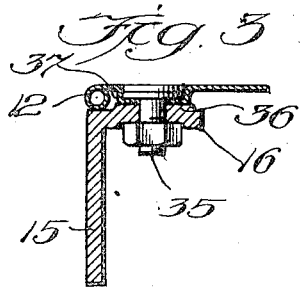
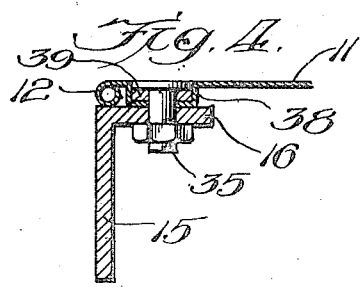
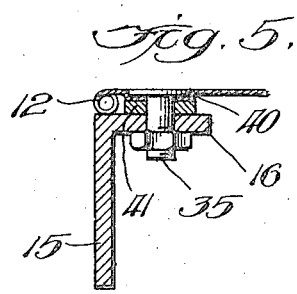
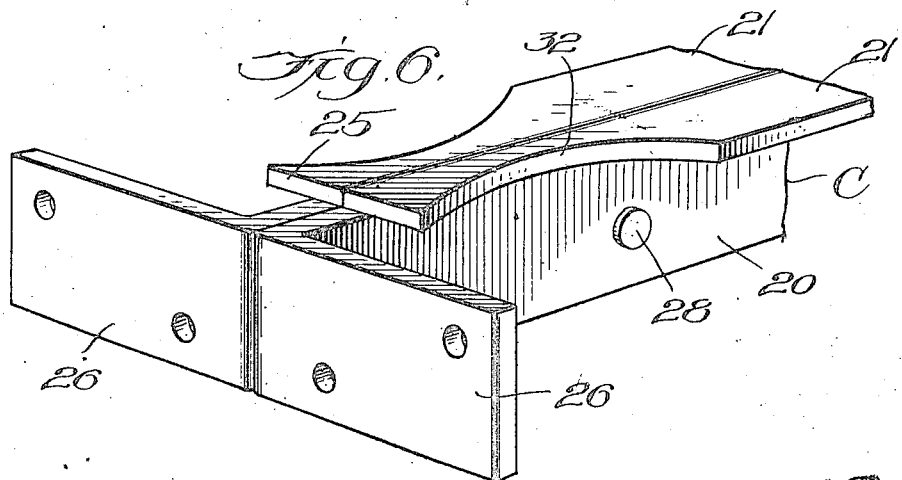
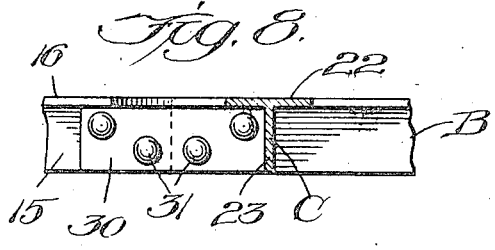
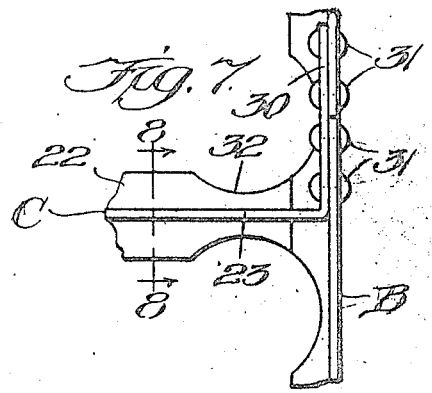

Patented Aug. 7, 1928.

1,680,220

UNITED STATES PATENT OFFICE.

ADRIEN L. LANGEL, OF CHICAGO, ILLINOIS, ASSIGNOR TO CHICAGO METALLIC MANUFACTURING CO., OF CHICAGO, ILLINOIS, A CORPORATION OF ILLINOIS.

MOUNTING FOR BAKING PANS.

Application filed October 10, 1927. Serial No. 225,148.

This invention relates to a mounting for baking pans and the like, and is concerned particularly with certain improvements in a frame structure in which a number of such pans may be supported in unitary fashion. It is aimed in this invention to provide a safe and compact mounting which may be formed of bars of standard kind, which will permit the pans to be individually secured in place or be removed therefrom without modification or mutilation of the pans, which will afford to the pans an adequate protection during handling and usage, and which will be light, inexpensive, and durable in service. Other objects and purposes will also appear from the description and claims herein, taken in conjunction with the accompanying drawings wherein is illustrated an embodiment of the invention in the manner following:

Figure 1 is a bottom plan view of the frame in which a plurality of pans are mounted;

Fig. 2 is a transverse section therethrough on line 2—2 of Fig. 1;

Figs. 3, 4 and 5 are sectional details of three forms of connection between the frame and pans mounted therein;

Fig. 6 is a detail in perspective of the connection between one end of the cross brace and the frame walls with which it is associated;

Fig. 7 is a fragmentary bottom plan view of another form of cross brace showing its connection with the associated frame wall; and Fig. 8 is a detail in section taken on line 8—8 of Fig. 7.

The mounting herein shown and described is adapted for baking pans A of various kinds, the ones illustrated being formed with a plurality of cups 10 which depend from a plate 11 having by preference its edges 12 rolled for reinforcement. The cups are arranged in rows the outermost of which are adjacent the edges of the plate whose corners are rounded in general conformity with the walls of the proximate cups. Such a pan construction, which is common at the present time, provides to the outside of the depending cups a marginal ledge which is utilized in the mounting of same within the frame B now to be described.

As shown, this frame is formed from an angle iron bar 15 having a flange 16 which is extended horizontally beneath the pan ledges. This flange is provided at intervals corresponding with the cups 10 with arc-shaped recesses 17 wherein the cups may be partly received, and adjacent one corner cup of each corner pan the flange may be cut away altogether as at 18 so as to facilitate bending of the bar at places where the four corners of the frame are to be located. In Fig. 1 I have illustrated a frame having capacity for four pans two of which are shown in full lines the outlines of the other two being on dotted lines. These pans are grouped in two rows and so require a support intermediately of two opposite walls of the frame. For this purpose I provide a cross brace C which may conveniently be made of a pair of angle irons having juxtaposed bars 20 and oppositely extended flanges 21, as shown in Figs. 1 and 6; or of a single T-iron having a wide top flange 22 with a wall 23 depending centrally therefrom, as shown in Figs. 7 and 8. The flanges 21 of the brace shown in Figs. 1 and 3 are cut off at 25 short of the bar ends 26 which are bent around oppositely through 90° so as to be mutually aligned and parallel with the proximate side of the frame B. The two ends of the angle iron forming this frame are in close proximity adjacent one end of the cross brace so that the oppositely turned ends 26 may abut the frame ends for connection therewith. This may be accomplished by the use of rivets or screws 27, preferably the former. In like manner the opposite end of the cross brace is secured on the side of the frame proximate thereto. By the use of other fastenings 28, the two components of the brace are joined inseparably to each other. In the case of the one-piece brace shown in Figs. 7 and 8, the top flange 22 is terminated short of the wall 23 the ends 30 of which are laterally bent into parallelism with the proximate frame sides with which they abut. The meeting ends of the frame are misaligned with respect to this brace so that its turned end 30 may lap past the break to effect a connection as with rivets 31.

The cross brace so provided and joined to the frame is recessed at 32, similarly to the cuts 17, the end recesses of the brace being complementary to the proximate recesses in the frame walls. In the illustrative construction a single brace is used to provide support for two rows of pans, but obviously the number and location of such braces will have to be determined by the capacity and arrangement desired. The pans are adapted for mounting in such a frame, and when placed therein from the upper side will present their ledges upon the flanges of the frame sides and cross braces supported thereby. With a pan having depending cups, as shown, the recesses on the flanges of the frame and cross brace are relied upon to accommodate such cups in part, so that the intervening flange portions will underlie the pan ledges to furnish the necessary support. After so mounting the pans in place, fastening means may be applied to hold the pans securely, and as suggestive of several instrumentalities for this purpose reference will now be made to Figs. 3, 4, and 5.

By reason of the rolled or reinforced edge 12, the main plate of each pan will be held off of the frame flange when the pan ledges are rested thereupon. It is desirable that this gap should be closed at points where connecting mediums, such as rivets or bolts 35, extend through the pan ledge and frame flange. As shown in Fig. 3, the flange 16 is provided at such points with an upwardly extended boss 36 which meets a second boss 37 depending from the ledge, the result being that a countersink is formed for the bolt or rivet head. In the construction of Fig. 4, one boss 38 alone is used, this being depended from the pan ledge a distance sufficient to rest on the frame flange. If desired, a washer 39 may be interposed between the head of the rivet or bolt and the bottom of this countersink, as shown. Again in Fig. 5 a single downstruck boss 40 is provided, there being a washer 41 placed between the boss and the flange 16 to close any remaining gap. These several formations are suggestive of many which would answer satisfactorily the requirements of this invention. In every case the heads of the rivets or bolts 35 are sunk flush with or below the surface of the pan so as to avoid interference with surrounding objects during handling.

It is important to note that the mounting of this invention provides a unitary framework for the several pans. These may be handled as a unit with convenience and facility. In addition, the structure is both strong and protective in that the angle bars extend down along the frame sides a desired distance, preferably not less than the depth of the cups which depend from the pans. As suggested in Fig. 2, the frame may be so proportioned as to hold the bottom of the cups slightly off of a table top or oven floor when the multiple-pan structure is in use. Also because the pan edges are secured tightly and closely to the frame top, there is very little chance of injury to the pans from their upper sides. Should it be desired, however, to replace any one or more pans, this may be accomplished easily by first removing the connecting bolts or rivets 35 and then substituting new pans which are similarly secured in place.

I claim:

1. The combination with a plurality of pans arranged in a row, each pan having a cup depending from a ledge which is laterally extended, of a common mounting for the several pans comprising an angle iron frame arranged to present an inwardly extending flange beneath the pan ledges, the frame being of rectangular contour and having portions of its flange cut away at the corners of the frame, and means extending through the flange and ledge of each pan for securing the latter to the frame, substantially as described.

2. The combination with a plurality of pans arranged in a row, each pan having a plurality of cups depending from a ledge which is laterally extended, of a common mounting for the several pans comprising an angle iron frame of rectangular form having an inwardly extended flange adapted to underlie the ledges of the pan to support the same, there being recesses in the flange of the frame at points adjacent the cups in the pans for partially accommodating the same, and means for securing the pans to the frame, substantially as described.

3. The combination with a plurality of pans arranged in plural rows, of an angle iron frame of rectangular form adapted to furnish a common support for the pans, the frame including also a cross brace extended between opposite sides thereof intermediately of two pan rows, the meeting ends of the angle iron forming the frame being aligned with one end of the brace, means connecting said brace end with both ends of the angle iron whereby to secure the same together, and means connecting the pans to the frame and cross brace, substantially as described.

4. The combination with a plurality of baking pans arranged in plural rows, each pan having plural rows of depending cups from which is outwardly extended a ledge, of a mounting for the several pan ledges comprising an angle bar frame of rectangular form having an inwardly extended flange provided with recesses adjacent the proximate cups of the pans for partially receiving the same, the flange being further cut away at each corner of the frame where the bar is bent through 90°, a cross brace extended between two opposite walls of the frame and connected at its ends therewith, the meeting ends of the bar forming the frame being aligned with one end of the cross brace and having connection therewith, and means for securing the several pans to the frame, substantially as described.

5. The combination with a plurality of pans arranged in plural rows, each pan having plural rows of cups depending from a surrounding ledge, of a common mounting for the pans comprising an angle bar bent into a frame of rectangular form with its two ends in adjacent relation along one side of the frame, a cross brace extended from a point adjacent the meeting ends of the frame bar to an opposite wall of the frame, means connecting the ends of the cross brace with the proximate frame sides whereby the meeting ends of the bar are also secured to each other, the cross brace and frame being provided with inwardly extended flanges adapted to underlie the pan ledges to support the same, there being recesses in the flanges adjacent the proximate cups whereby to partly receive the same, and means for securing the pans fast to the frame, substantially as described.

6. The combination with a pan having rows of cups depending from a surrounding ledge, of a rectangular angle iron frame adapted to surround the pan and provide a support for the ledge thereof, the frame being extended below the ledge along the cups to afford lateral protection thereto, the flange of the angle iron being extended inwardly beneath the ledge and having recesses therein adjacent the proximate cups of the pan for partly receiving the same, the flange being cut away adjacent the corners of the frame, and means for securing the pans to the frame, substantially as described.

7. The combination with a pan having a cup depending from a surrounding narrow ledge, of a bar bent into the form of a rectangular frame adapted to extend closely along the cup and beneath the ledge, the bar being recessed to partly accommodate the cup whereby adjacent portions of the bar may be extended inwardly for a greater distance beneath the ledge, and means passing through the ledge and bar portions so extending inwardly for securing the pan to the frame, substantially as described.

8. The combination with a rectangular angle iron frame having an inwardly extended flange, of a pan having a ledge with a reinforced edge adapted to rest upon the frame flange, there being a gap between the frame and the pan ledge when the pan edge is in contact with the flange, connecting means passing through the flange and pan ledge at intervals for connecting the one to the other, and means surrounding each such connecting means occupying the space within the gap, substantially as described.

9. In combination with a rectangular angle iron frame having an inwardly extended flange of a pan provided with an outwardly extending ledge which terminates in a reinforced edge of increased thickness, the pan being adapted for reception in the frame with its edge resting upon the flange thereof whereby the ledge is slightly spaced therefrom, spaced means extending through the flange and ledge for connecting the pan to the frame, and means surrounding said connecting means extending between the ledge and flange for closing the space therebetween, substantially as described.

ADRIEN L. LANGEL.